June 28, 1932.    R. H. UPSON    1,864,962
AIRPLANE BRAKE AND RUDDER CONTROL
Filed Sept. 10, 1931
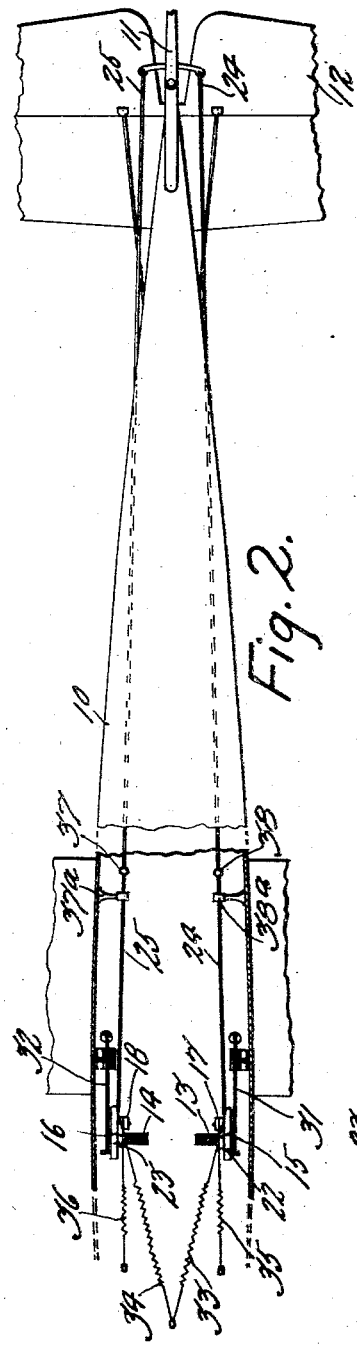
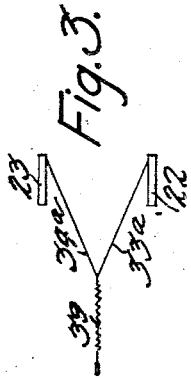
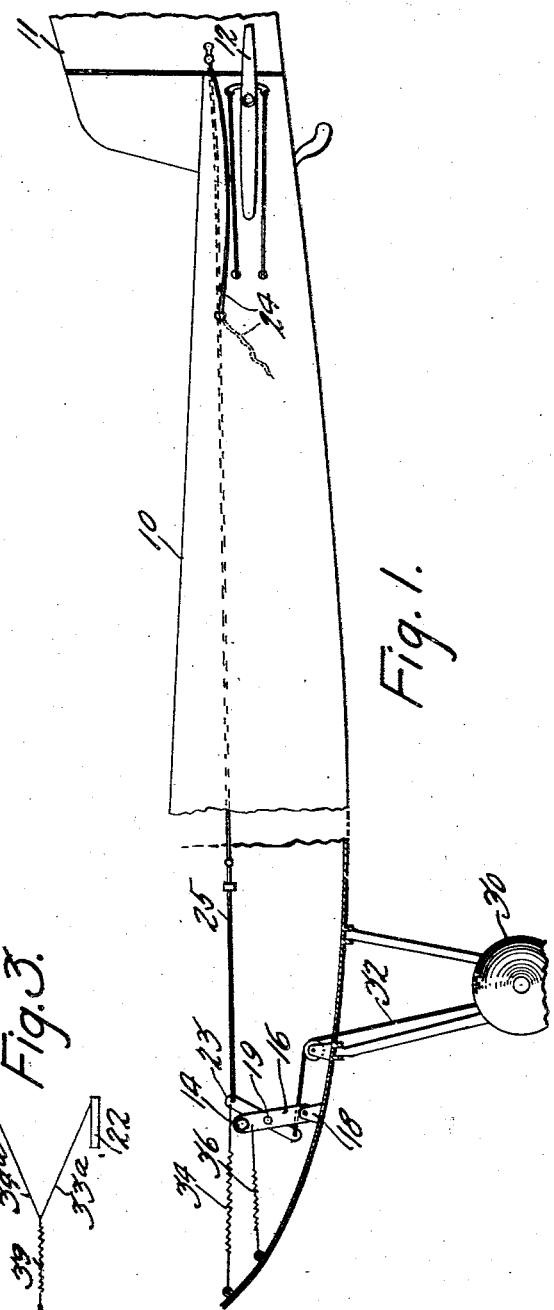
INVENTOR.
RALPH H. UPSON
BY
ATTORNEY.

Patented June 28, 1932

1,864,962

UNITED STATES PATENT OFFICE

RALPH H. UPSON, OF ANN ARBOR, MICHIGAN

AIRPLANE BRAKE AND RUDDER CONTROL

Application filed September 10, 1931. Serial No. 562,106.

This invention relates to a combined rudder and brake control for use in connection with aircraft and provides an improved means by which the rudder and the brakes of an aircraft may be operated from the same two pedals in an effective and relatively fool-proof manner.

An object of the invention is to provide a suitable mechanism by which two pedals commonly used to actuate the usual rudder in an airplane may be also employed as a means for applying the wheel brakes.

An incidental object is to provide a means comprising a neutral stop point for the rudder so that the same may be automatically returned from any moved position when the rudder control is released in a manner related somewhat to the elevator control disclosed in my Patent No. 1,806,432 and similar to the means disclosed in my copending application Ser. No. 562,107 filed Sept. 10, 1931 for a combined elevator and aileron control.

A further object is to provide a brake control separately maneuverable for either of the two wheels when desired, yet normally balanced against each other in a manner as to prevent "ground looping".

Brake operation in the present day airplanes shows a great amount of diversity in the detail mechanism used, but all types thus far developed have the common disadvantage of requiring at least one extra control besides those that are actually necessary for the operation of an airplane without brakes. In the present instance there is featured an arrangement whereby an additional movement of the conventional controls actuating the rudder is employed to apply the brakes.

One of the means previously considered for accomplishing the desired end was to insert springs in the rudder cables which by their elongation would permit both rudder pedals to be depressed simultaneously or separately as desired for the combined operation of the rudder and brakes. This method had the disadvantage however of adding to the required brake force all the force that might ever have to be put on the rudder. Still it has long been recognized that the rudder pedals would make an ideal means for operating the brakes if a satisfactory connection could be devised.

Further objects and advantages of the invention will be in part obvious from an inspection of the accompanying drawing and a careful consideration of the following particular description and claims of one form of mechanism embodying my invention.

In the drawing:

Figure 1 is a side elevation partly in section of an airplane illustrating the application of my invention.

Figure 2 is a plan view of Fig. 1.

Figure 3 is a fragmentary plan view of an alternative spring arrangement.

With reference to the drawing, 10 designates the fuselage of an airplane having a rudder 11 and an elevator 12.

Pedals 13 and 14 are carried by the pedal bars 15 and 16 which are disposed at the right and left side of the fuselage 10 within easy reach of the feet of the pilot, said bars being pivoted for oscillation to brackets 17 and 18 secured preferably to the floor boards.

Intermediate the two ends of each of said bars I have attached for oscillation upon the pivots 19 the auxiliary bars 22 and 23 the upper ends of each of said bars being connected by means of the cables 24 and 25 to the right and the left side respectively of the rudder 11. The lower end of each of said auxiliary bars is connected to the brakes (not shown) of the wheels 30 by means of the cables 31 and 32. To the upper end of these bars I have attached the tension springs 33 and 34 and it might be said that only one spring 39 of sufficient power, as in Fig. 3, and attached by means of the cables 33a and 34a could be employed in place of the individual springs for each bar. This tends to return the rudder to a more definite neutral position. Adjacent the upper ends of the pedal bars 15 and 16, I have also attached tension springs 35 and 36.

In operation, when either one of the pedals 13 and 14 is pressed forward by the pilot, both the brake and the rudder will be actuated on that particular side of the airplane. The desired relation of force and movement of the brake actuating mechanism as compared to the force and movement of the rudder is taken care of by the proportions given the lever arms of the bars 22, 23 which are mounted upon the pedal bars 15 and 16 besides the choice of other leverages in the control system as will be readily understood.

When both the pedals 13 and 14 are moved forward simultaneously to the same degree in an effort to apply both brakes evenly as when coming to a stop, the upper ends of the bars 22, 23 will not be moved and the rudder will remain in a neutral position; however the lower ends of the bars will move forwardly and as a result the cables 31, 32 will be actuated to apply the brakes on both of the wheels.

Steering an airplane when running over the ground is greatly facilitated by the above mechanism since the wheel on either side can be braked independently of the other in the usual manner which will cause the plane to pivot about the retarded wheel while material assistance is also given in that direction by a corresponding movement of the rudder at the same time. Incidently ground looping is discouraged by the fact that in normal operation the difference in brake force between the two sides cannot exceed a certain designed proportion of the rudder force. On the other hand, if it is desired to turn very sharply, particularly from a standstill, stops 37, 37a and 38, 38a are arranged in the rudder system to take effect before the full forward travel of the pedal 13 or 14 is reached; the balance of the pedal movement on either side being then applied exclusively to the brake.

The chief function of the springs shown herein is for the purpose of returning both the brakes and the rudder to their normal positions when the controls are released.

Variations may be resorted to within the scope of the invention and portions of the improvements may be used without the others whilst not departing from the spirit of the invention.

Having thus described my invention, I claim:

1. In apparatus of the class described, the combination with an airplane having wheel brakes and a control surface, of an actuating system carrying a lever pivoted thereon; the remote ends of said lever being respectively connected to one of said brakes and to said control surface.

2. In apparatus of the class described, the combination with an air plane having wheel brakes and a control surface, of a pair of pivoted levers adapted for manual actuation, a further lever carried by each of the aforesaid levers; the remote ends of each of the last said levers being respectively connected to said brakes and to said control surface, and spring means tending to return all of said levers to a normal position.

3. In apparatus of the class described, the combination with an airplane having wheel brakes and a control surface, of a pivoted lever on either side of said airplane adapted for manual actuation, a further lever carried by each of the aforesaid levers; the remote ends of the last said levers being respectively connected to said brakes and to said control surface.

4. In apparatus of the class described, the combination with an airplane having wheel brakes and a control surface, of a pair of levers disposed in spaced relation on either side of the airplane each being pivoted at its lower end for independent fore and aft actuation by a pilot, a further pair levers pivoted intermediate their ends in a manner so as to partake of the movement of the first pair of levers respectively, connections between the opposed sides of the control surface and an end of each one of the last said levers, and connections between the wheel brakes and the other end of each one of the last said levers.

5. In apparatus of the class described, the combination with an airplane having wheel brakes and a rudder, of a pair of levers disposed in spaced relation on either side of the airplane for independent fore and aft actuation by a pilot, brake and rudder actuating elements, a force proportioning means comprising a lever pivoted in moving relation to each of the first said levers and having connection with said brakes and rudder actuating elements for the independent or combined operation thereof.

6. A rudder and brake control system for an airplane, comprising two foot pedals and two floating levers, the opposite ends of each lever being connected respectively to the rudder and to one of the brakes, and an intermediate point on each of said levers mounted in moving relation to the respective pedals.

Signed at Ann Arbor in the county of Washtenaw and State of Michigan this 25th day of August, 1931.

RALPH H. UPSON. [L. S.]